United States Patent
Lin et al.

(10) Patent No.: US 12,063,360 B2
(45) Date of Patent: Aug. 13, 2024

(54) PREDICTION PROCESSING SYSTEM USING REFERENCE DATA BUFFER TO ACHIEVE PARALLEL NON-INTER AND INTER PREDICTION AND ASSOCIATED PREDICTION PROCESSING METHOD

(71) Applicant: MEDIATEK INC., Hsin-Chu (TW)

(72) Inventors: Kai-Chun Lin, Hsinchu (TW);
Chi-Hung Chen, Hsinchu (TW);
Meng-Jye Hu, Hsinchu (TW);
Hsiao-En Chen, Hsinchu (TW);
Chih-Wen Yang, Hsinchu (TW);
Chien-Wei Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 13 days.

(21) Appl. No.: 17/876,567

(22) Filed: Jul. 29, 2022

(65) Prior Publication Data

US 2023/0064790 A1    Mar. 2, 2023

Related U.S. Application Data

(60) Provisional application No. 63/238,261, filed on Aug. 30, 2021.

(51) Int. Cl.
| | |
|---|---|
| H04N 19/107 | (2014.01) |
| H04N 19/105 | (2014.01) |
| H04N 19/159 | (2014.01) |
| H04N 19/172 | (2014.01) |
| H04N 19/176 | (2014.01) |

(Continued)

(52) U.S. Cl.
CPC ......... *H04N 19/107* (2014.11); *H04N 19/105* (2014.11); *H04N 19/159* (2014.11); *H04N 19/172* (2014.11); *H04N 19/176* (2014.11); *H04N 19/423* (2014.11); *H04N 19/503* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 2006/0126740 A1* | 6/2006 | Lin | H04N 19/42 375/E7.125 |
| 2008/0025412 A1* | 1/2008 | Lee | H04N 19/156 375/E7.176 |

(Continued)

FOREIGN PATENT DOCUMENTS

| | | |
|---|---|---|
| CN | 110662074 A | 1/2020 |
| TW | 202029761 A | 8/2020 |
| TW | 202101989 A | 1/2021 |

*Primary Examiner* — Chikaodili E Anyikire
(74) *Attorney, Agent, or Firm* — Winston Hsu

(57) ABSTRACT

A prediction processing system includes a processing circuit and a reference data buffer. The processing circuit performs a first inter prediction operation upon a first prediction block in a frame to generate a first inter prediction result, and further performs a second inter prediction operation upon a second prediction block during a first period. The reference data buffer buffers a reference data derived from the first inter prediction result. The processing circuit further fetches the reference data from the reference data buffer, and performs a non-inter prediction operation according to at least the reference data during a second period, wherein the second period overlaps the first period.

21 Claims, 16 Drawing Sheets

(51) Int. Cl.
*H04N 19/423* (2014.01)
*H04N 19/503* (2014.01)
*H04N 19/593* (2014.01)

(56) References Cited

U.S. PATENT DOCUMENTS

| | | | |
|---|---|---|---|
| 2015/0084970 A1* | 3/2015 | Schaub | H04N 19/423 345/506 |
| 2018/0103260 A1* | 4/2018 | Chuang | H04N 19/70 |
| 2020/0244953 A1* | 7/2020 | Seregin | H04N 19/593 |

\* cited by examiner

PREDICTION PROCESSING SYSTEM USING REFERENCE DATA BUFFER TO ACHIEVE PARALLEL NON-INTER AND INTER PREDICTION AND ASSOCIATED PREDICTION PROCESSING METHOD

CROSS REFERENCE TO RELATED APPLICATIONS

This application claims the benefit of U.S. Provisional Application No. 63/238,261, filed on Aug. 30, 2021. The content of the application is incorporated herein by reference.

BACKGROUND

The present invention relates to video processing, and more particularly, to a prediction processing system using a reference data buffer to achieve parallel non-inter and inter prediction and an associated prediction processing method.

The conventional video coding standards generally adopt a block based coding technique to exploit spatial and temporal redundancy. For example, the basic approach is to divide the whole source picture into a plurality of blocks, perform intra/inter prediction on each block, transform residues of each block, and perform quantization and entropy encoding. Besides, a reconstructed picture is generated in a coding loop to provide reference pixel data used for coding following blocks. For certain video coding standards, in-loop filter(s) may be used for enhancing the image quality of the reconstructed frame. The video decoder is used to perform an inverse operation of a video encoding operation performed by a video encoder. For example, the video decoder may have a plurality of processing circuits, such as an entropy decoding circuit, an intra prediction circuit, an inter prediction circuit, an inverse quantization circuit, an inverse transform circuit, a reconstruction circuit, and in-loop filter(s). With regarding the intra/inter prediction, one largest coding unit (LCU)/super block (SB) can be divided into prediction blocks that may include intra prediction blocks and inter prediction blocks. Regarding one intra prediction block, the intra prediction may refer to intra/inter prediction results of neighboring blocks. In other words, data dependency exists between one intra prediction block and one inter prediction block. Hence, there is a need for an innovative prediction scheme that is capable of performing parallel non-inter and inter prediction for system performance enhancement.

SUMMARY

One of the objectives of the claimed invention is to provide a prediction processing system using a reference data buffer to achieve parallel non-inter and inter prediction and an associated prediction processing method.

According to a first aspect of the present invention, an exemplary prediction processing system is disclosed. The exemplary prediction processing system includes a processing circuit and a reference data buffer. The processing circuit is arranged to perform a first inter prediction operation upon a first prediction block to generate a first inter prediction result, and is further arranged to perform a second inter prediction operation upon a second prediction block in the frame during a first period. The reference data buffer is arranged to buffer a reference data derived from the first inter prediction result. The processing circuit is further arranged to fetch the reference data from the reference data buffer, and perform a non-inter prediction operation according to at least the reference data during a second period, wherein the second period overlaps the first period.

According to a second aspect of the present invention, an exemplary prediction processing method is disclosed. The exemplary prediction processing method includes: performing a first inter prediction operation upon a first prediction block in a frame to generate a first inter prediction result; buffering a reference data derived from the first inter prediction result in a reference data buffer; performing a second inter prediction operation upon a second prediction block in the frame during a first period; fetching the reference data from the reference data buffer, and performing a non-inter prediction operation according to at least the reference data during a second period, wherein the second period overlaps the first period.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
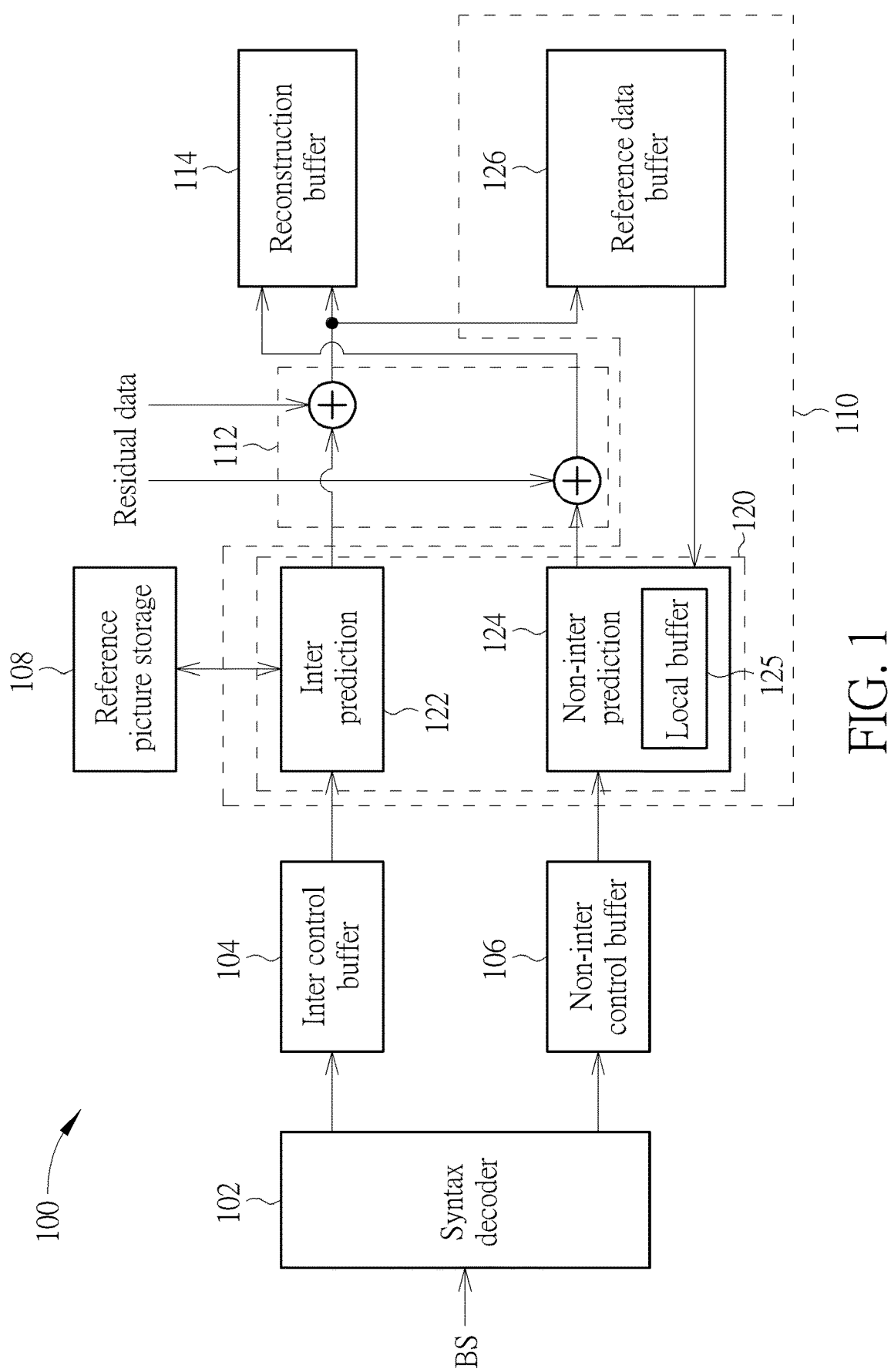
FIG. 1 is a diagram illustrating a first video processing apparatus according to an embodiment of the present invention.

FIG. 1 is a diagram illustrating a first video processing apparatus according to an embodiment of the present invention. The video processing apparatus 100 may be a part of a video decoder, and may include a syntax decoder 102, an inter control buffer 104, a non-inter control buffer 106, a reference picture storage 108, a prediction processing system 110, a reconstruction circuit 112, and a reconstruction buffer 114. It should be noted that only the circuits pertinent to the present invention are illustrated in FIG. 1. In practice, the video processing apparatus 100 may include additional circuits to achieve designated functions. The prediction processing system 110 may include a processing circuit 120 and a reference data buffer 126. The processing circuit 120 may include an inter prediction circuit (labeled by "Inter prediction") 122 and a non-inter prediction circuit (labeled by "Non-inter prediction") 124, where the non-inter prediction circuit 124 may have a local buffer 125 for buffering non-inter reference data (e.g. intra reference data). The non-inter prediction circuit 124 may be used for dealing with a normal intra prediction (NIP) mode, and/or may be used for dealing with a coding mode treated like intra prediction in terms of the coding order, such as a copy from neighbor (CfN) mode. In the following, the term "non-inter prediction" may be referred to as an NIP mode, or may be referred to a coding mode that is treated like intra prediction in terms of the coding order. The processing circuit 120 is shown having two prediction circuits, but the present invention is not limited thereto. In some embodiments, the processing circuit 120 may have one inter prediction circuit, one intra prediction circuit, and other non-inter prediction circuit(s). In some embodiments, the processing circuit 120 may have a control logic circuit (not shown) used to manage control flows for achieving parallel non-inter and inter prediction.

The syntax decoder 102 is arranged to parse an encoded bitstream BS to output control syntax elements of inter prediction to the inter control buffer 104 and output control syntax elements of non-inter prediction to the non-inter control buffer 106. The inter control buffer 104 may trigger inter prediction for blocks according to the control syntax elements parsed from the encoded bitstream BS. The non-inter control buffer 106 may trigger non-inter prediction for blocks according to the control syntax elements parsed from the encoded bitstream BS. The reference picture storage 108 may be a decoded picture buffer (DPB) used for storing the candidate reference pictures (decoded pictures) used by inter prediction. The prediction processing system 110 is arranged to determine a prediction result of a current block, where the current block may be an inter prediction block or a non-inter prediction block. The reconstruction circuit 112 is arranged to combine the prediction result of the current block (e.g. inter prediction block or non-inter prediction block) and corresponding residual data of the current block to generate a reconstruction result of the current block, and output the reconstruction result of the current block to the reconstruction buffer 114. Since the present invention is focused on the prediction processing system 110, further description of the syntax decoder 102, the inter control buffer 104, the non-inter control buffer 106, the reference picture storage 108, the reconstruction circuit 112, and the reconstruction buffer 114 is omitted here for brevity.

Regarding the prediction processing system 110, the inter prediction circuit 122 is arranged to perform a first inter prediction operation upon a first prediction block to generate a first inter prediction result (e.g. an inter-predicted block found though inter prediction), and further arranged to perform a second inter prediction operation upon a second prediction block during a first period; the reference data buffer 126 is arranged to buffer a reference data derived from the first inter prediction result; and the non-inter prediction circuit 124 is arranged to fetch the reference data from the reference data buffer 126, and perform a prediction operation (e.g. NIP-mode prediction or CfN-mode prediction) according to at least the reference data during a second period. In some embodiments, the second period overlaps the first period, and the start time of the first inter prediction operation is earlier than the start time of the non-inter prediction operation. With the help of the reference data buffer 126 used for buffering the reference data which is the non-inter reference data needed by the non-inter prediction operation, parallel inter and non-inter prediction (e.g. parallel processing of the non-inter prediction of one non-inter prediction block and the inter prediction of one inter prediction block) can be achieved.

Figure 2:
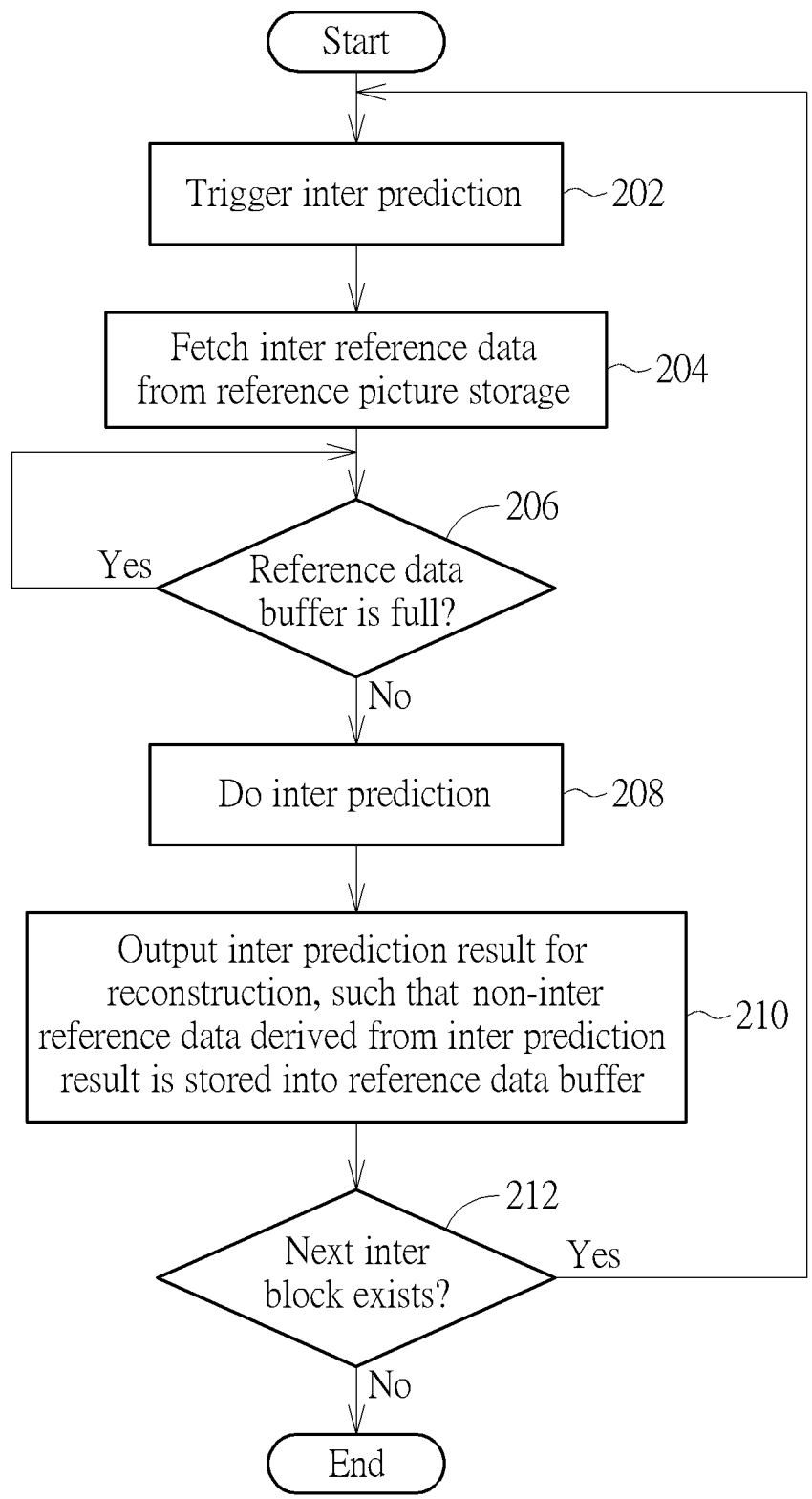
FIG. 2 is a flowchart illustrating an inter prediction method according to an embodiment of the present invention.

FIG. 2 is a flowchart illustrating an inter prediction method according to an embodiment of the present invention. The inter prediction method may be employed by the inter prediction circuit 122 shown in FIG. 1, and execution of the steps may be managed by a control logic circuit (not shown) in the processing circuit 120. Provided that the result is substantially the same, the steps are not required to be executed in the exact order shown in FIG. 2. At step 202, the inter prediction circuit 122 is triggered to initiate inter prediction of a current inter prediction block. At step 204, the inter prediction circuit 122 fetches inter reference data from the reference picture storage 108, where the inter reference data may include reconstructed data of one or more reference pictures (decoded pictures). At step 206, the inter prediction circuit 122 checks if the reference data buffer 126 is full. If it is determined that the reference data buffer 126 is full, the inter prediction circuit 122 waits for a free space available in the reference data buffer 126. If it is determined that the reference data buffer 126 is not full or is empty, the flow proceeds with step 208. At step 208, the inter prediction circuit 122 performs inter prediction upon the current inter prediction block according to the reference data fetched from reference picture storage 108, and generates an inter prediction result for the current inter prediction block. At step 210, the inter prediction circuit 122 outputs the inter prediction result determined for the current inter prediction block (i.e. inter-predicted block found by inter prediction) to the reconstruction circuit 112, such that non-inter reference data derived from the inter prediction result is stored into the reference data buffer 126. Specifically, a reconstruction result (i.e. a reconstructed block) is obtained by combining the inter prediction result and corresponding residual data, and is stored into the reconstruction buffer 114. In this embodiment, at least a portion (i.e. part or all) of the reconstruction result (reconstructed block) is stored into the reference data buffer 126 to act as non-inter reference data for later use. In a case where a first non-inter prediction type (e.g. NIP) is employed by the non-inter prediction circuit 124, the non-inter reference data (i.e., intra reference data) stored into the reference data buffer 126 may include only a portion of the reconstruction result determined for one inter prediction block. In another case where a second non-inter prediction type (e.g. CfN) is employed by the non-inter prediction circuit 124, the non-inter reference data stored into the reference data buffer 126 may include all of the reconstruction result determined for one inter prediction block. At step 212, the inter prediction circuit 122 determines if there is a next inter prediction block not processed yet. If the next inter prediction block exists, the flow proceeds with step 202. If all inter prediction blocks have been processed, the inter prediction processing is ended.

Figure 3:
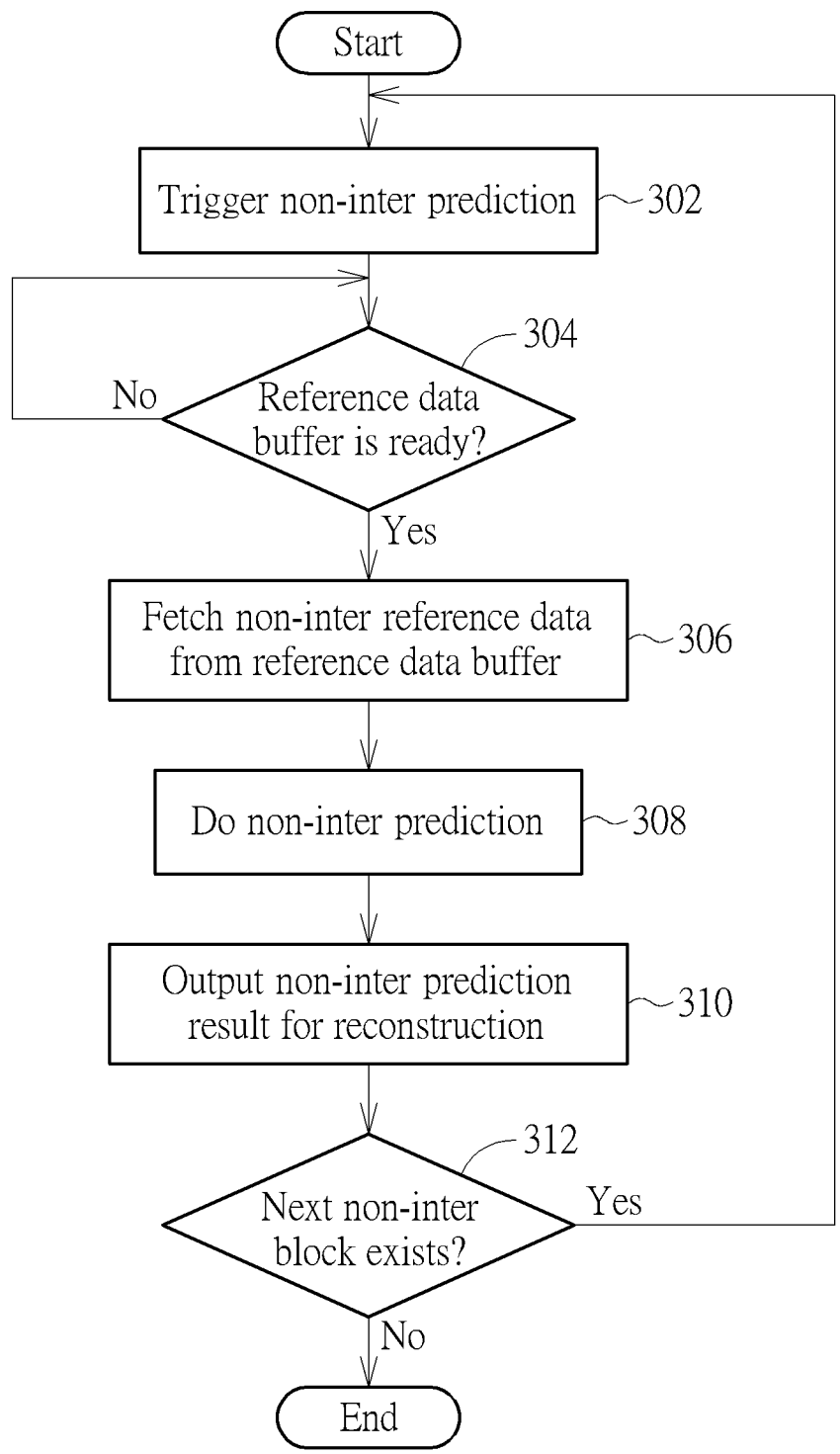
FIG. 3 is a flowchart illustrating a non-inter prediction method according to an embodiment of the present invention.

FIG. 3 is a flowchart illustrating a non-inter prediction method according to an embodiment of the present invention. The non-inter prediction method may be employed by the non-inter prediction circuit 124 shown in FIG. 1, and execution of the steps may be managed by a control logic circuit (not shown) in the processing circuit 120. Provided that the result is substantially the same, the steps are not required to be executed in the exact order shown in FIG. 3. At step 302, the non-inter prediction circuit 124 is triggered to initiate intra prediction of a current non-inter prediction block. At step 304, the non-inter prediction circuit 124 checks if the reference data buffer 126 is ready to provide the needed non-inter reference data (which is reconstructed data derived from inter prediction result(s) of previously processed inter prediction block(s)). If it is determined that the non-inter reference data is not ready in the reference data buffer 126, the non-inter prediction circuit 124 waits for the required non-inter reference data being ready in the reference data buffer 126. If it is determined that the non-inter reference data is available in the reference data buffer 126, the flow proceeds with step 306. At step 306, the non-inter prediction circuit 124 fetches the non-inter reference data from the reference data buffer 126. At step 308, the non-inter prediction circuit 124 performs non-inter prediction upon the current non-inter prediction block according to at least the non-inter reference data fetched from the reference data buffer 126. At step 310, the non-inter prediction circuit 124 outputs the non-inter prediction result determined for the current non-inter prediction block (i.e. non-inter predicted block) to the reconstruction circuit 112, such that a reconstruction result (i.e. a reconstructed block) obtained by combining the non-inter prediction result and corresponding residual data is stored into the reconstruction buffer 114. In addition, the non-inter prediction circuit 124 may have a local buffer 125 used to buffer at least a portion (i.e. part or all) of the reconstruction result of the current non-inter prediction block to act as non-inter reference data for later use. At step 312, the non-inter prediction circuit 124 determines if there is a next non-inter prediction block not processed yet. If the next non-inter prediction block exists, the flow proceeds with step 302. If all non-inter prediction blocks have been processed, the non-inter prediction processing is ended.

In this embodiment, the reference data buffer 126 is used to buffer the non-inter reference data that includes at least a portion (i.e. part or all) of a reconstruction result (i.e. reconstructed block) obtained by combining an inter prediction result (i.e. inter-predicted block) and corresponding residual data. Since non-inter prediction of a current non-inter prediction block may fetch the needed non-inter reference data (which is obtained from a reconstruction result derived from an inter prediction result determined for a previous inter prediction block) from the reference data buffer 126, the inter prediction circuit 122 may start inter prediction of a not-yet-processed inter prediction block without waiting for an end of non-inter prediction of the current non-inter prediction block. With a proper setting of a buffer size of the reference data buffer 126, parallel inter and non-inter prediction can be realized. Further description of the proposed parallel inter and non-inter prediction scheme is provided as below with reference to the accompanying drawings.

Figure 4:
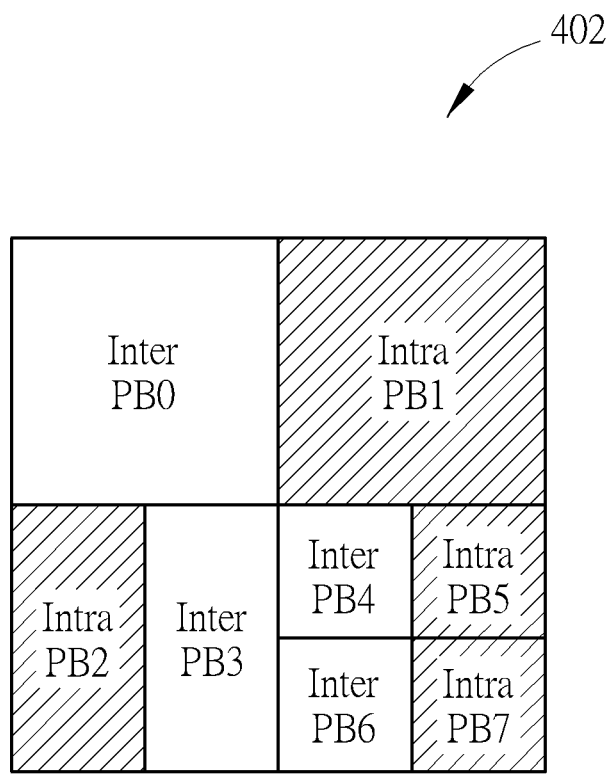
FIG. 4 is a diagram illustrating prediction blocks obtained by partitioning of one largest coding unit (LCU)/super block (SB) according to an embodiment of the present invention.
Figure 5:
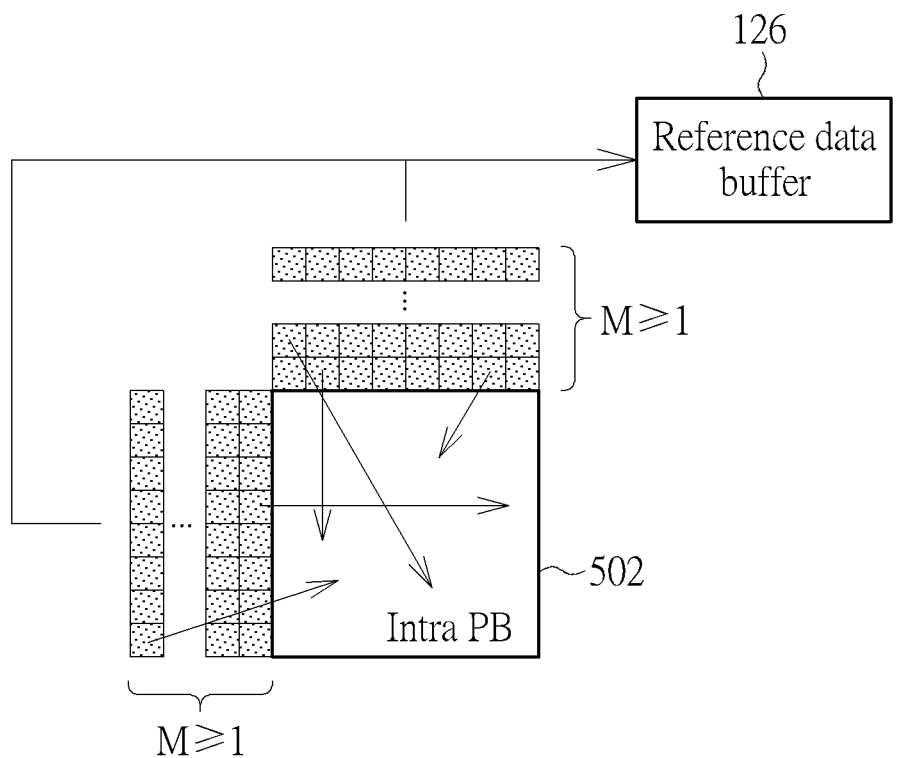
FIG. 5 is a diagram illustrating neighbor data used by normal intra prediction according to an embodiment of the present invention.

When NIP is employed by the non-inter prediction circuit 124, the intra reference data stored into the reference data buffer 126 may include only a portion of the reconstruction result determined for one inter prediction block. Please refer to FIG. 4 in conjunction with FIG. 5. FIG. 4 is a diagram illustrating prediction blocks obtained by partitioning of one largest coding unit (LCU) /super block (SB) according to an embodiment of the present invention. FIG. 5 is a diagram illustrating neighbor data used by normal intra prediction according to an embodiment of the present invention. As shown in FIG. 4, one LCU/SB 402 may be partitioned into a plurality of prediction blocks (PBs), including inter prediction blocks PB0, PB3, PB4, PB6 and intra prediction blocks PB1, PB2, PB5, PB7. Regarding one intra prediction block 502 shown in FIG. 5, reconstructed data of top neighbors and/or reconstructed data of left neighbors may be referenced for intra prediction. That is, M lines of top or left decoded pixels can be intra prediction reference. For example, when the intra prediction mode under NIP is an angular prediction mode, M may be equal to 1. For another example, when the intra prediction mode under NIP is a multi-reference line (MRL) prediction mode, M may be larger than 1. Some or all of the top and left decoded pixels may belong to inter prediction blocks. That is, one top neighboring block of the intra prediction block 502 may be an inter prediction block, and/or a left neighboring block of the intra prediction block 502 maybe an inter prediction block. As shown in FIG. 5, the reference data buffer 126 can be used to buffer neighbor data of the intra prediction block 502 that is obtained from top decoded pixels and/or left decoded pixels that belong to inter prediction blocks.

Figure 6:
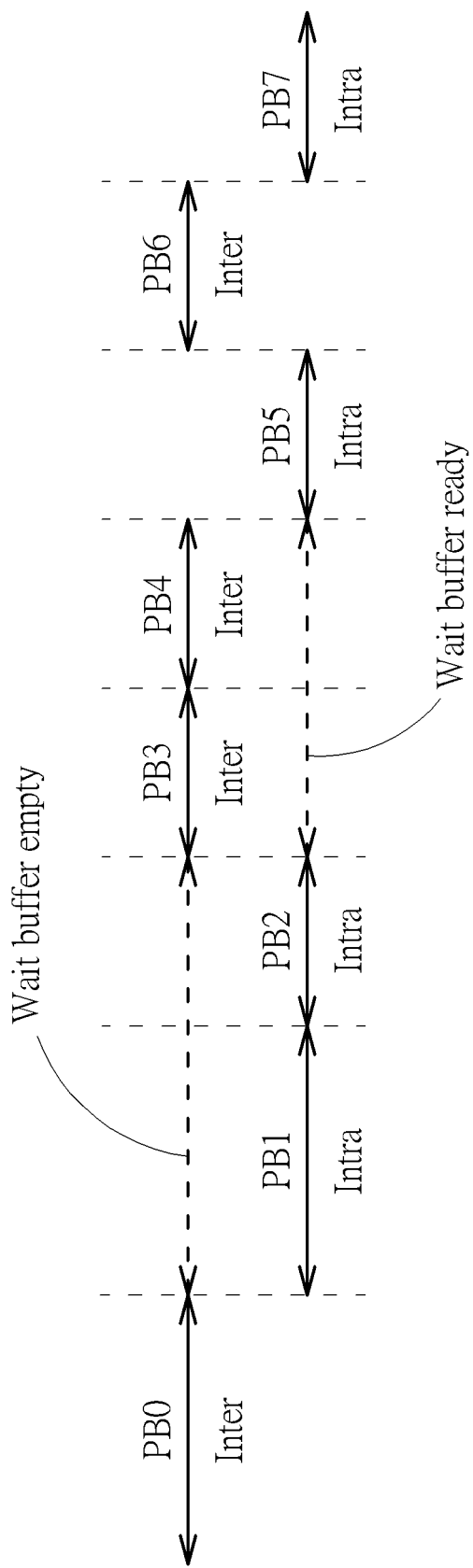
FIG. 6 is a diagram illustrating a first prediction process of a plurality of prediction blocks in one LCU/SB shown in FIG. 4 according to an embodiment of the present invention.

Please refer to FIG. 4 in conjunction with FIG. 6. FIG. 6 is a diagram illustrating a first prediction process of a plurality of prediction blocks in one LCU/SB 402 shown in FIG. 4 according to an embodiment of the present invention. Suppose that the reference data buffer 126 can store neighbor data (i.e. intra reference data) obtained from only a single inter prediction block. When the inter prediction circuit 122 performs inter prediction upon the inter prediction block PB0, reconstructed data of left neighbors of the intra prediction block PB1 and reconstructed data of top neighbors of the intra prediction block PB2 are obtained by reconstruction based on the inter prediction result of the inter prediction block PB0, and is stored into the reference data buffer 126 for later use. Since the reference data buffer 126 can store neighbor data (i.e. intra reference data) obtained from only a single inter prediction block, inter prediction of the next inter prediction block PB3 is not triggered until the reference data buffer 126 becomes empty. After inter prediction of the inter prediction block PB0 is completed, reconstructed data of left neighbors of the intra prediction block PB1 is available in the reference data buffer 126, and the non-inter prediction circuit 124 performs intra prediction upon the intra prediction block PB1 according to the reconstructed data of left neighbors fetched from the reference data buffer 126. After intra prediction of the intra prediction block PB1 is completed, the reconstructed data of left neighbors stored in the reference data buffer 126 is no longer needed and can be deleted.

Furthermore, after inter prediction of the inter prediction block PB0 is completed, reconstructed data of top neighbors of the intra prediction block PB2 is available in the reference data buffer 126. Hence, after intra prediction of the intra prediction block PB1 is completed, the non-inter prediction circuit 124 performs intra prediction upon the next intra prediction block PB2 according to the reconstructed data of top neighbors fetched from the reference data buffer 126. Similarly, after intra prediction of the intra prediction block PB2 is completed, the reconstructed data of top neighbors stored in the reference data buffer 126 is no longer needed and can be deleted. Since the reference data buffer 126 is empty now, inter prediction of the next inter prediction block PB3 can be triggered, and intra prediction of the next intra prediction block PB5 is not triggered until reconstructed data of left neighbors of intra prediction block PB5 is ready in the reference data buffer 126.

Since a person skilled in the art can readily understand details of the processing of following inter prediction blocks PB3-PB6 and intra prediction blocks PB5-PB6 after reading above paragraphs, further description is omitted here for brevity.

An inter intra sequence process can be realized under a condition that the maximum buffer size allows the reference data buffer 126 to store neighbor data (i.e. intra reference data) obtained from only a single inter prediction block. However, this is for illustrative purposes only, and is not meant to be a limitation of the present invention. For example, when a maximum buffer size is properly set for allowing the reference data buffer 126 to store neighbor data (i.e. intra reference data) obtained from multiple inter prediction blocks, an inter intra parallel process can be realized.

Figure 7:
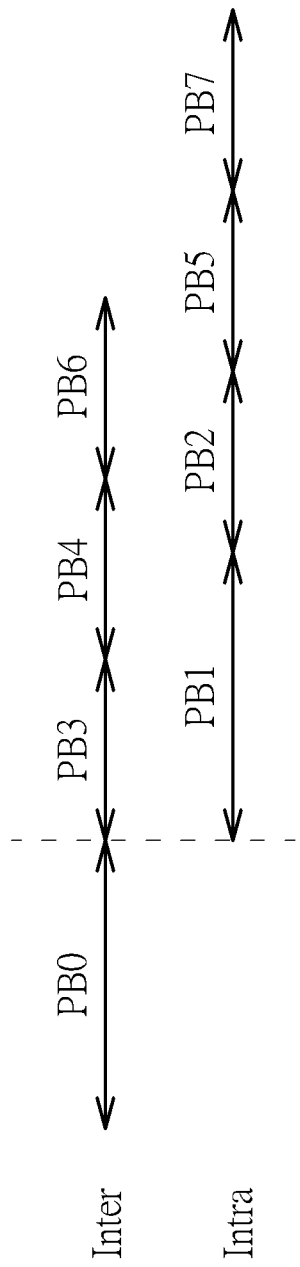
FIG. 7 is a diagram illustrating a second prediction process of a plurality of prediction blocks in one LCU/SB shown in FIG. 4 according to an embodiment of the present invention.

Please refer to FIG. 4 in conjunction with FIG. 7. FIG. 7 is a diagram illustrating a second prediction process of a plurality of prediction blocks in one LCU/SB 402 shown in FIG. 4 according to an embodiment of the present invention. Suppose that the reference data buffer 126 can store neighbor data (i.e. intra reference data) obtained from all inter prediction blocks in one LCU/SB. When the inter prediction circuit 122 performs inter prediction upon the inter prediction block PB0, reconstructed data of left neighbors of the intra prediction block PB1 and reconstructed data of top neighbors of the intra prediction block PB2 are obtained by reconstruction based on the inter prediction result of the inter prediction block PB0, and is stored into the reference data buffer 126 for later use. Since the reference data buffer 126 can store neighbor data (i.e. intra reference data) obtained from all inter prediction blocks in one LCU/SB, inter prediction of the inter prediction block PB3 is started after the inter prediction of the inter prediction block PB0 is completed. Similarly, inter prediction of the inter prediction block PB4 is started after the inter prediction of the inter prediction block PB3 is completed, and inter prediction of the inter prediction block PB6 is started after the inter prediction of the inter prediction block PB4 is completed.

After inter prediction of the inter prediction block PB0 is completed, reconstructed data of left neighbors of the intra prediction block PB1 is available in the reference data buffer 126. Since the required intra reference data is ready in the reference data buffer 126, the non-inter prediction circuit 124 is triggered to perform intra prediction upon the intra prediction block PB1 according to the reconstructed data of left neighbors fetched from the reference data buffer 126.

Similarly, after inter prediction of the inter prediction block PB0 is completed, reconstructed data of top neighbors of the intra prediction block PB2 is available in the reference data buffer 126. Since the required intra reference data is ready in the reference data buffer 126 after intra prediction of the intra prediction block PB1 is completed, the non-inter prediction circuit 124 is triggered to perform intra prediction upon the intra prediction block PB2 according to the reconstructed data of top neighbors fetched from the reference data buffer 126.

After inter prediction of the inter prediction block PB4 is completed, reconstructed data of left neighbors of the intra prediction block PB5 is available in the reference data buffer 126. Since the required intra reference data is ready in the reference data buffer 126 after intra prediction of the intra prediction block PB2 is completed, the non-inter prediction circuit 124 is triggered to perform intra prediction upon the intra prediction block PB5 according to the reconstructed data of left neighbors fetched from the reference data buffer 126 and reconstructed data of top neighbors available in the local buffer 125.

After inter prediction of the inter prediction block PB6 is completed, reconstructed data of left neighbors of the intra prediction block PB7 is available in the reference data buffer 126. Since the required intra reference data is ready in the reference data buffer 126 after intra prediction of the intra prediction block PB5 is completed, the non-inter prediction circuit 124 is triggered to perform intra prediction upon the intra prediction block PB7 according to the reconstructed data of left neighbors fetched from the reference data buffer 126 and reconstructed data of top neighbors available in the local buffer 125.

As shown in FIG. 7, an inter intra parallel process can be realized. That is, a first period in which the inter prediction circuit 122 is doing inter prediction for one inter prediction block overlaps a second period in which the non-inter prediction circuit 124 is doing intra prediction for one intra prediction block. In this way, the overall decoding performance can be improved.

In a case where the maximum buffer size of the reference data buffer 126 allows the reference data buffer 126 to store neighbor data (i.e. intra reference data) obtained from all inter prediction blocks in only a single LCU/SB, inter prediction of one inter prediction block of a next LCU/SB is not started until the reference data buffer 126 becomes empty at the end of intra prediction of the last intra prediction block of a current LCU/SB. As shown in FIG. 7, no inter prediction of a next inter prediction block included in a next LCU/SB is triggered at the time the inter prediction of the last inter prediction block PB6 included in a current LCU/SB is done. However, this is for illustrative purposes only, and is not meant to be a limitation of the present invention. In an alternative design, the buffer size of the reference data buffer 126 may be larger enough to allow the reference data buffer 126 to store neighbor data (i.e. intra reference data) obtained from all inter prediction blocks in N LCUs/SBs, where N≥2.

Figure 8:
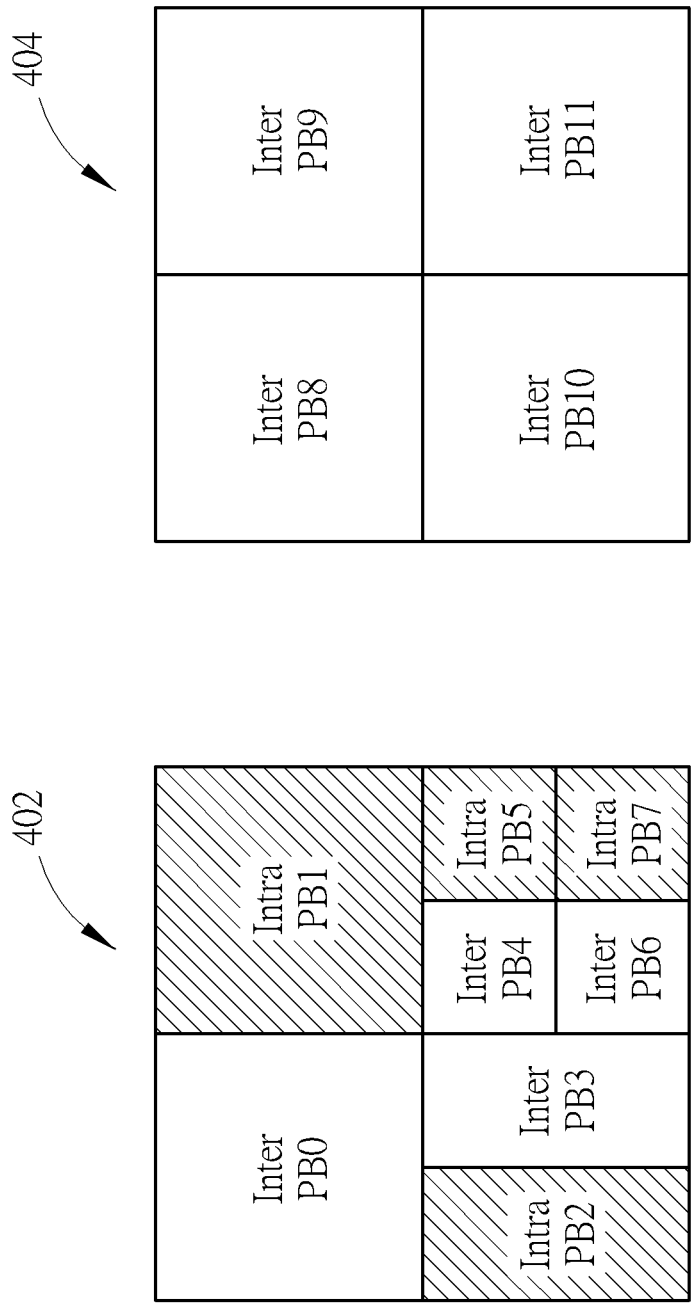
FIG. 8 is a diagram illustrating prediction blocks obtained by partitioning of two consecutive LCUs/SBs according to an embodiment of the present invention.
Figure 9:
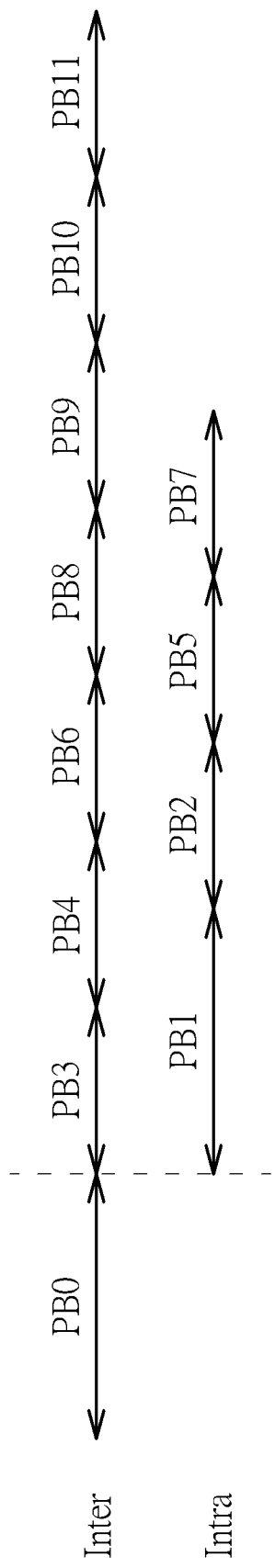
FIG. 9 is a diagram illustrating a prediction process of a plurality of prediction blocks in two LCUs/SBs shown in FIG. 8 according to an embodiment of the present invention.

Please refer to FIG. 8 in conjunction with FIG. 9. FIG. 8 is a diagram illustrating prediction blocks obtained by partitioning of two consecutive LCUs/SBs according to an embodiment of the present invention. FIG. 9 is a diagram illustrating a prediction process of a plurality of prediction blocks in two LCUs/SBs shown in FIG. 8 according to an embodiment of the present invention. As shown in FIG. 8, the next LCU/SB 404 may be partitioned into a plurality of inter prediction blocks PB8, PB9, PB10, PB11. Suppose that the reference data buffer 126 can store neighbor data (i.e. intra reference data) obtained from all inter prediction blocks in two LCUs/SBs. When the inter prediction circuit 122 performs inter prediction upon the inter prediction block PB0, reconstructed data of left neighbors of the intra prediction block PB1 and reconstructed data of top neighbors of the intra prediction block PB2 are obtained by reconstruction based on the inter prediction result of the inter prediction block PB0, and is stored into the reference data buffer 126 for later use. Since the reference data buffer 126 can store neighbor data (i.e. intra reference data) obtained from all inter prediction blocks in two LCUs/SBs, inter prediction of the inter prediction block PB3 included in LCU/SB 402 is started after the inter prediction of the inter prediction block PB0 included in LCU/SB 402 is completed, inter prediction of the inter prediction block PB4 included in LCU/SB 402 is started after the inter prediction of the inter prediction block PB3 included in LCU/SB 402 is completed, inter prediction of the inter prediction block PB6 included in LCU/SB 402 is started after the inter prediction of the inter prediction block PB4 included in LCU/SB 402 is completed, inter prediction of the inter prediction block PB8 included in LCU/SB 404 is started after the inter prediction of the inter prediction block PB6 included in LCU/SB 402 is completed, inter prediction of the inter prediction block PB9 included in LCU/SB 404 is started after the inter prediction of the inter prediction block PB8 included in LCU/SB 404 is completed, inter prediction of the inter prediction block PB10 included in LCU/SB 404 is started after the inter prediction of the inter prediction block PB9 included in LCU/SB 404 is completed, and inter prediction of the inter prediction block PB11 included in LCU/SB 404 is started after the inter prediction of the inter prediction block PB10 included in LCU/SB 404 is completed. To put it simply, if N≥2, the inter prediction circuit 122 is allowed to perform inter prediction upon the following inter prediction blocks included in a next LCU/SB without waiting for completion of intra prediction of all intra prediction blocks include in a current LCU/SB.

Regarding the embodiment shown in FIG. 1, the reference data buffer 126 is used to buffer the non-inter reference data that includes at least a portion (i.e. part or all) of a reconstruction result (i.e. reconstructed block) obtained by combining an inter prediction result (i.e. inter-predicted block) and corresponding residual data. The non-inter reference data may be fetched from reference data buffer 126 for CfN-mode prediction. The CfN mode is an independent mode, and may be treated like intra prediction in terms of the coding order. For example, the NIP mode and the CfN mode may have the same coding order. The CfN mode may be performed by an independent module other than an inter prediction module and an intra prediction module, or may be performed by reusing the intra prediction module, or may be performed by reusing the inter prediction module with the reference picture set by the current picture. When CfN mode is employed by the non-inter prediction circuit 124, the non-inter prediction circuit 124 may be an independent circuit designed to deal with the CfN-mode prediction, or may be integrated in an intra prediction circuit, or may be integrated in the inter prediction circuit 122.

Figure 10:
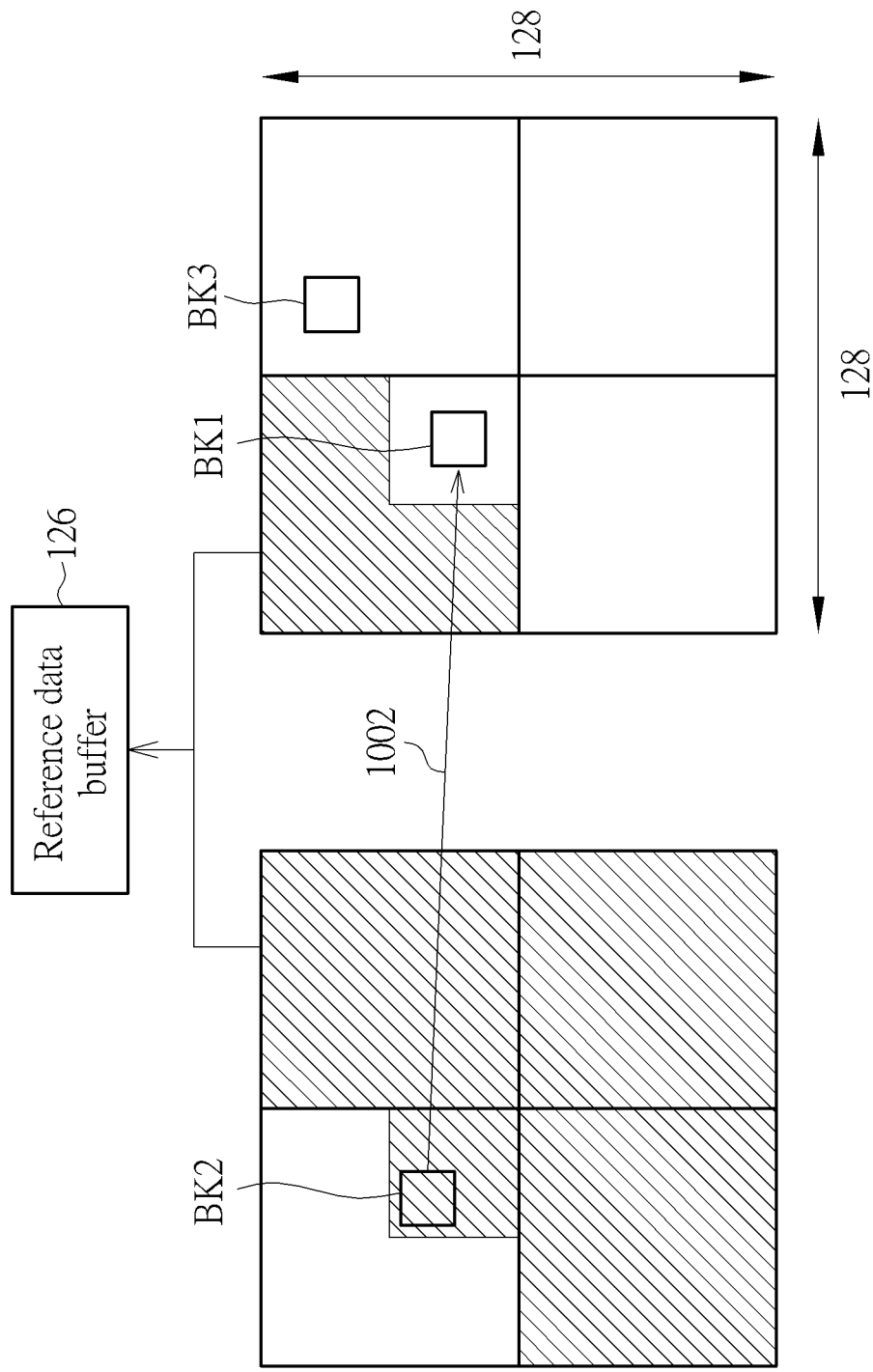
FIG. 10 is a diagram illustrating non-inter reference data used by a copy from neighbor (CfN) mode under a first LCU size according to an embodiment of the present invention.
Figure 11:
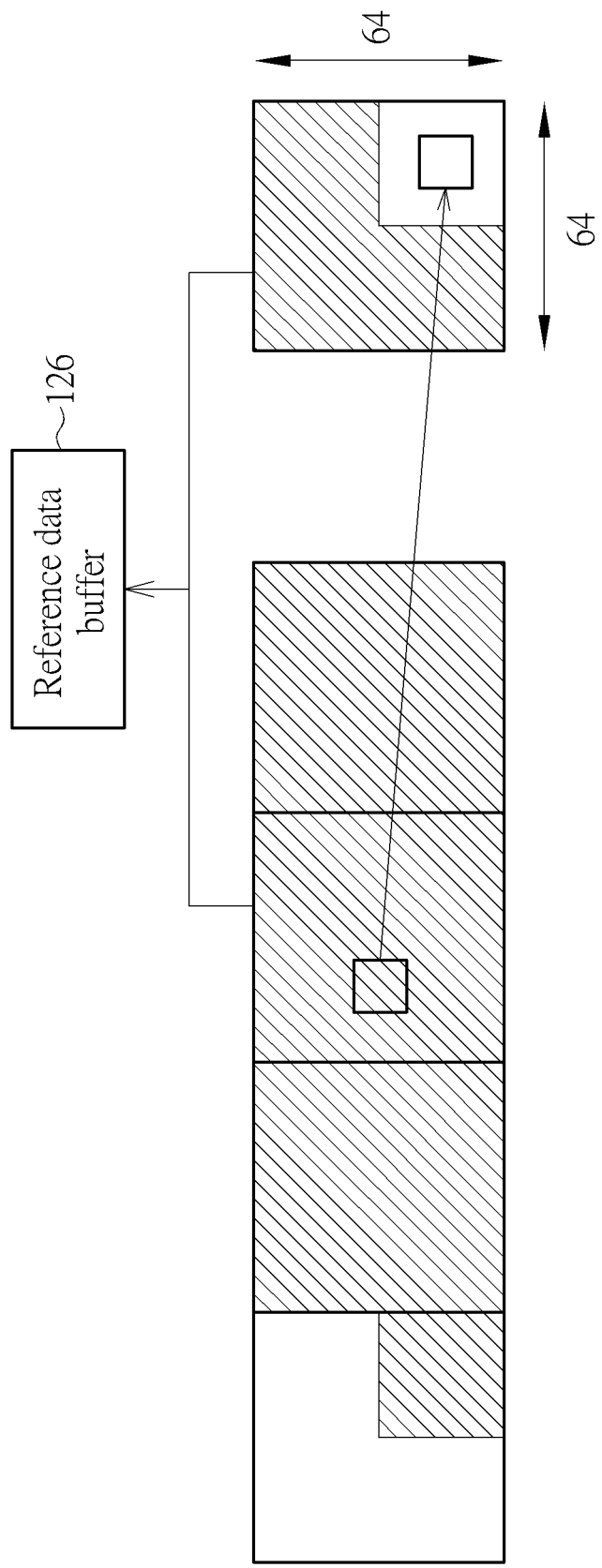
FIG. 11 is a diagram illustrating non-inter reference data used by a CfN mode under a second LCU size according to an embodiment of the present invention.
Figure 12:
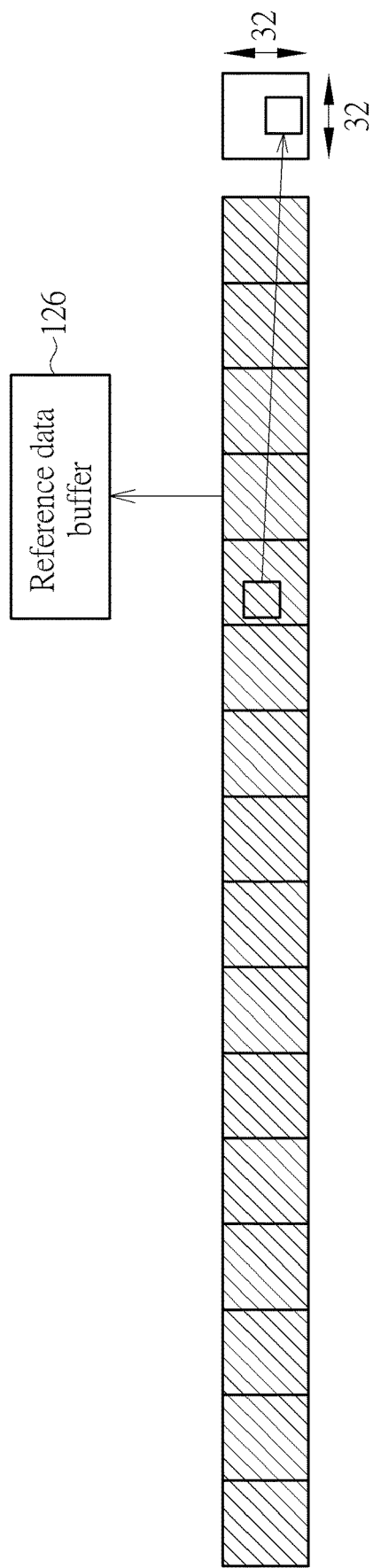
FIG. 12 is a diagram illustrating non-inter reference data used by a CfN mode under a third LCU size according to an embodiment of the present invention.

When the CfN mode is selected, the non-inter reference data stored into the reference data buffer 126 may include all of the reconstruction result determined for one inter prediction block. FIG. 10 is a diagram illustrating non-inter reference data used by a CfN mode under a first LCU size (e.g., 128×128) according to an embodiment of the present invention. In detail, the CfN mode uses motion information 1002 to identify a reference prediction in the current picture. For example, the CfN mode may be an intra block copy (IBC) mode specified in the versatile video coding (VCC) standard or any other coding tool to specify a reference prediction in the current block using motion information. The reference data buffer 126 may serve as an IBC buffer with a buffer size not smaller than 4×64×64 reconstructed samples, where reconstructed data in the shaded areas are available in the reference data buffer 126. In a case where LCU size=128×128, a reconstructed block BK2 is identified using parsed motion information 1002, and is used to act as a prediction result of a block BK1 in the same picture, where reconstructed samples of the reconstructed block BK2 may be obtained by combining an inter prediction result of an inter prediction block (i.e. inter-predicted block) and the corresponding residual data, and stored into the reference data buffer 126 to act as non-inter reference data of the block BK1. Hence, the non-inter reference data can be fetched from the reference data buffer 126 when performing prediction upon the block BK1 under the IBC mode. It should be noted that the same concept of using the reference data buffer 126 to buffer non-inter reference data derived from inter prediction results of previously processed inter prediction blocks and later used by IBC-mode prediction can also be applied to an LCU with a different LCU size (e.g. 64×64 or 32×32). FIG. 11 is a diagram illustrating non-inter reference data used by a CfN mode under a second LCU size (e.g., 64×64) according to an embodiment of the present invention. FIG. 12 is a diagram illustrating non-inter reference data used by a CfN mode under a third LCU size (e.g., 32×32) according to an embodiment of the present invention. Regarding the LCU size being K×K, the previous decoded Q×K×K can be reference data, as illustrated in FIG. 11. Regarding the LCU size being (1/2)K×(1/2)K, the previous decoded 4Q×(1/2)K×(1/2)K can be reference data, as illustrated in FIG. 12. Regarding the LCU size being 2K×2K, the previous decoded Q×K×K can be reference data, as illustrated in FIG. 10. Hence, the buffer size of the reference data buffer 126 needs to be bigger than Q×K×K.

It should be noted that, with the help of the reference data buffer 126, parallel inter and non-inter prediction can be realized when the block BK1 is processed under the IBC mode. For example, the inter prediction circuit 122 performs inter prediction upon an inter block BK3 when the IBC-mode prediction is dealing with the block BK1 according to non-inter reference data (e.g. reconstructed data of the inter block BK2) fetched from the reference data buffer 126, where a start of inter prediction of the inter block BK2 is earlier than a start time of IBC-mode prediction of the block BK1, and is also earlier than a start of inter prediction of the inter block BK3.

Figure 13:
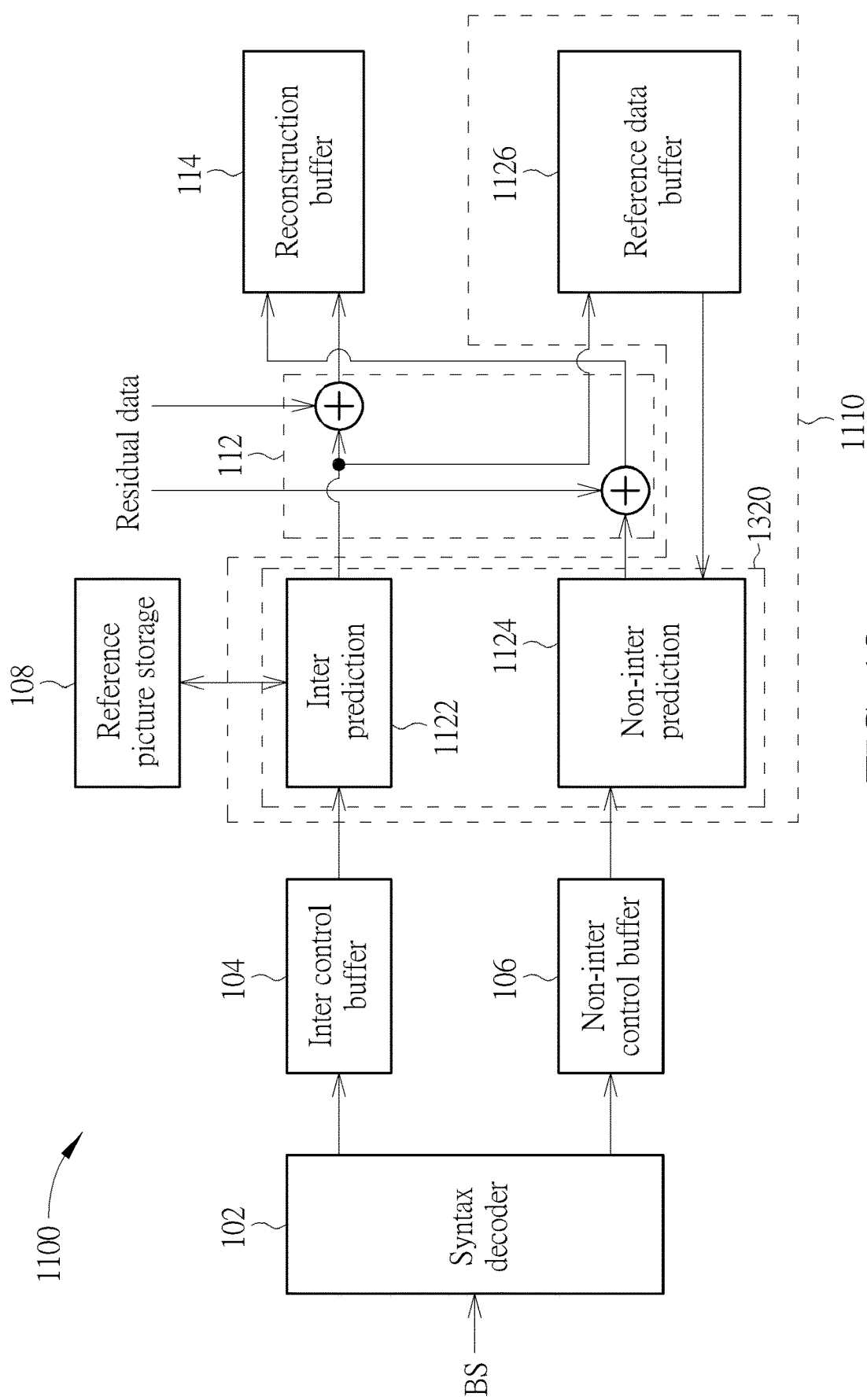
FIG. 13 is a diagram illustrating a second video processing apparatus according to an embodiment of the present invention.

FIG. 13 is a diagram illustrating a second video processing apparatus according to an embodiment of the present invention. The video processing apparatus 1100 may be a part of a video decoder. The major difference between the video processing apparatuses 1100 and 100 is that the prediction processing system 1110 uses a reference data buffer 1126 to store an inter prediction result of one prediction block as the non-inter reference data. Regarding the prediction processing system 1110, a processing circuit 1320 may include an inter prediction circuit 1122 and a non-inter prediction circuit 1124. The non-inter prediction circuit 1124 may be used for dealing with an NIP mode, and/or may be used for dealing with a coding mode treated like intra prediction in terms of the coding order, such as a weighting inter intra (WII) mode. The processing circuit 1320 is shown having two prediction circuits, but the present invention is not limited thereto. In some embodiments, the processing circuit 1320 may have one inter prediction circuit, one intra prediction circuit, and other non-inter prediction circuit(s). In some embodiments, the processing circuit 1320 may have a control logic circuit (not shown) used to manage control flows for achieving parallel non-inter and inter prediction.

The inter prediction circuit 1122 is arranged to perform a first inter prediction operation upon a first prediction block to generate a first inter prediction result (e.g. an inter-predicted block determined for the first prediction block though inter prediction), and is further arranged to perform a second inter prediction operation upon a second prediction block during a first period; the reference data buffer 1126 is arranged to buffer a reference data derived from the first inter prediction result (particularly, the reference data includes the first inter prediction result); and the non-inter prediction circuit 1124 is arranged to fetch the reference data from the reference data buffer 1126, and perform a non-inter prediction operation (e.g., WII-mode prediction) according to the reference data during a second period, wherein the second period overlaps the first period, and the start time of the first inter prediction operation is earlier than the start time of the non-inter prediction operation. With the help of the reference data buffer 1126 used for buffering the reference data needed by the non-inter prediction operation, parallel inter and non-inter prediction can be achieved.

The WII mode is an independent mode, and may be treated like intra prediction in terms of the coding order. For example, the NIP mode and the WII mode may have the same coding order. The WII mode may be performed by an independent module other than an inter prediction module and an intra prediction module, or may be performed by reusing the intra prediction module, or maybe performed by reusing the inter prediction module. When WII mode is employed by the non-inter prediction circuit 1124, the non-inter prediction circuit 1124 may be an independent circuit designed to deal with the WII-mode prediction, or may be integrated in an intra prediction circuit, or may be integrated in the inter prediction circuit 1122.

In this embodiment, the non-inter prediction circuit 1124 may employ the WII mode for processing a current prediction block, where the non-inter reference data needed by WII-mode prediction of the current prediction block and stored in the reference data buffer 1126 may be the inter prediction result of the same prediction block. For example, the WII mode may be a combined inter and intra prediction (CIIP) mode specified in the VVC standard.

Figure 14:
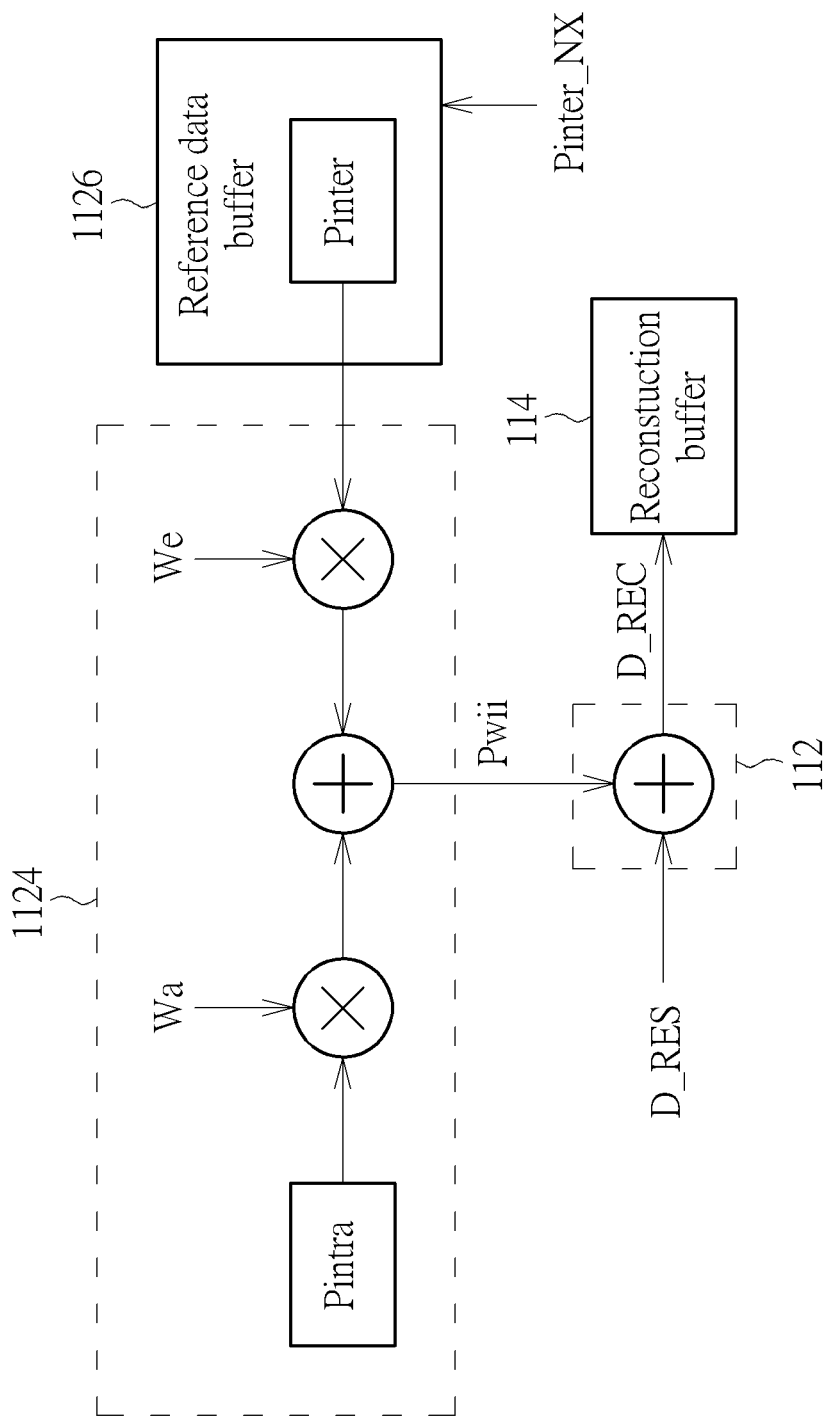
FIG. 14 is a diagram illustrating a combined inter and intra prediction (CIIP) operation performed by the non-inter prediction circuit shown in FIG. 13 according to an embodiment of the present invention.

FIG. 14 is a diagram illustrating a CIIP operation performed by the non-inter prediction circuit 1124 shown in FIG. 13 according to an embodiment of the present invention. The inter prediction circuit 1122 sends an inter prediction result $P_{inter}$ of a current prediction block to the reference data buffer 1126. After the inter prediction result $P_{inter}$ is available in the reference data buffer 1126, the non-inter prediction circuit 1124 fetches the inter prediction result $P_{inter}$ from the reference data buffer 1126, obtains an intra prediction result $P_{intra}$ for the current prediction block, and determines a prediction result $P_{wii}$ for the current prediction block according to the intra prediction result $P_{intra}$ and the inter prediction result $P_{inter}$. For example, the computation of the prediction result $P_{wii}$ may be expressed by the following formula.

$$P_{wii}=We*P_{inter}+Wa*P_{intra} \text{ where } We+Wa=1 \quad (1)$$

The prediction result $P_{wii}$ is provided to the reconstruction circuit 112. Hence, a reconstruction result D_REC of the current prediction block is generated by combining the prediction result $P_{wii}$ and the corresponding residual data D_RES, and then stored into the reconstruction buffer 114. If the buffer size of the reference data buffer 1126 is large enough to store inter prediction results of multiple prediction blocks, the inter prediction circuit 1122 may perform inter prediction upon a next prediction block when the non-inter prediction circuit 1124 is dealing with related computation for obtaining the prediction result $P_{wii}$, and may store an inter prediction result $P_{inter}$_NX of the next prediction block into the reference data buffer 1126 for later use. In other words, parallel inter and non-inter prediction can be achieved with the help of the reference data buffer 1126.

Figure 15:
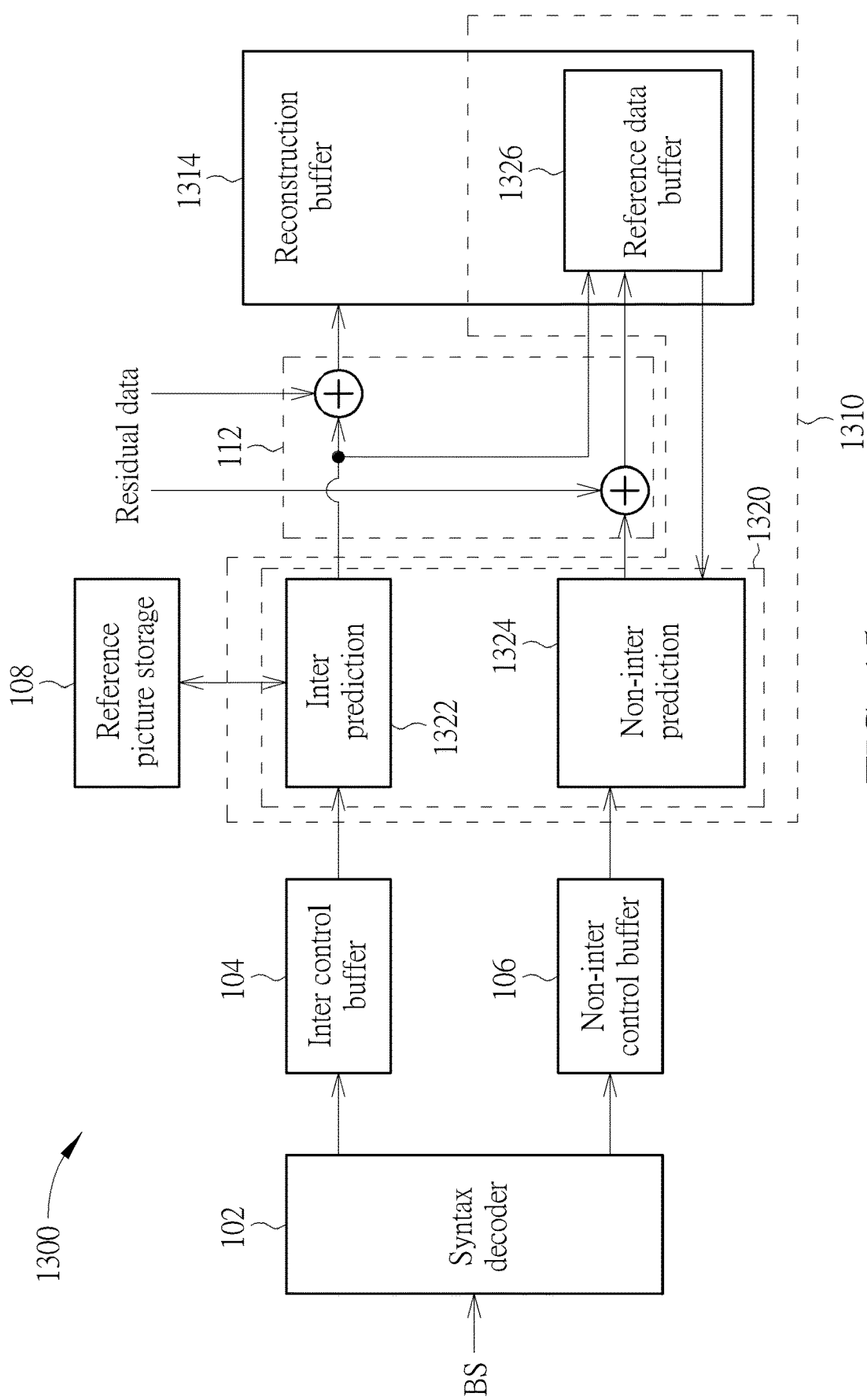
FIG. 15 is a diagram illustrating a third video processing apparatus according to an embodiment of the present invention.

FIG. 15 is a diagram illustrating a third video processing apparatus according to an embodiment of the present invention. The video processing apparatus 1300 may be a part of a video decoder. The major difference between the video processing apparatuses 1100 and 1300 is that the prediction processing system 1310 uses a reference data buffer 1326 that is implemented by a shared space allocated in a reconstruction buffer 1314. Regarding the prediction processing system 1310, the inter prediction circuit 1322 is arranged to perform a first inter prediction operation upon a first prediction block to generate a first inter prediction result (e.g. an inter-predicted block determined for the first prediction block though inter prediction), and is further arranged to perform a second inter prediction operation upon a second prediction block during a first period; the reference data buffer 1326 is arranged to buffer a reference data derived from the first inter prediction result (particularly, the reference data includes the first inter prediction result); and the non-inter prediction circuit 1324 is arranged to fetch the reference data from the reference data buffer 1326, and perform a non-inter prediction operation (e.g., WII-mode prediction) according to the reference data during a second period, wherein the second period overlaps the first period, and the start time of the first inter prediction operation is earlier than the start time of the non-inter prediction operation. With the help of the reference data buffer 1326 used for buffering the reference data needed by the non-inter prediction operation, parallel inter and non-inter prediction can be achieved. In this embodiment, the non-inter prediction circuit 1324 may employ a WII mode for processing a current prediction block, where the non-inter reference data needed by WII-mode prediction of the current prediction block and stored in the reference data buffer 1326 may be the inter prediction result of the same prediction block. For example, the WII mode may be a CIIP mode specified in the VVC standard. Furthermore, the inter prediction result and the reconstruction result of the same prediction block may share the same storage space. Specifically, the inter prediction result stored in the reference data buffer 1326 (which is apart of the reconstruction buffer 1314) maybe overwritten by the reconstruction result of the same prediction block.

Figure 16:
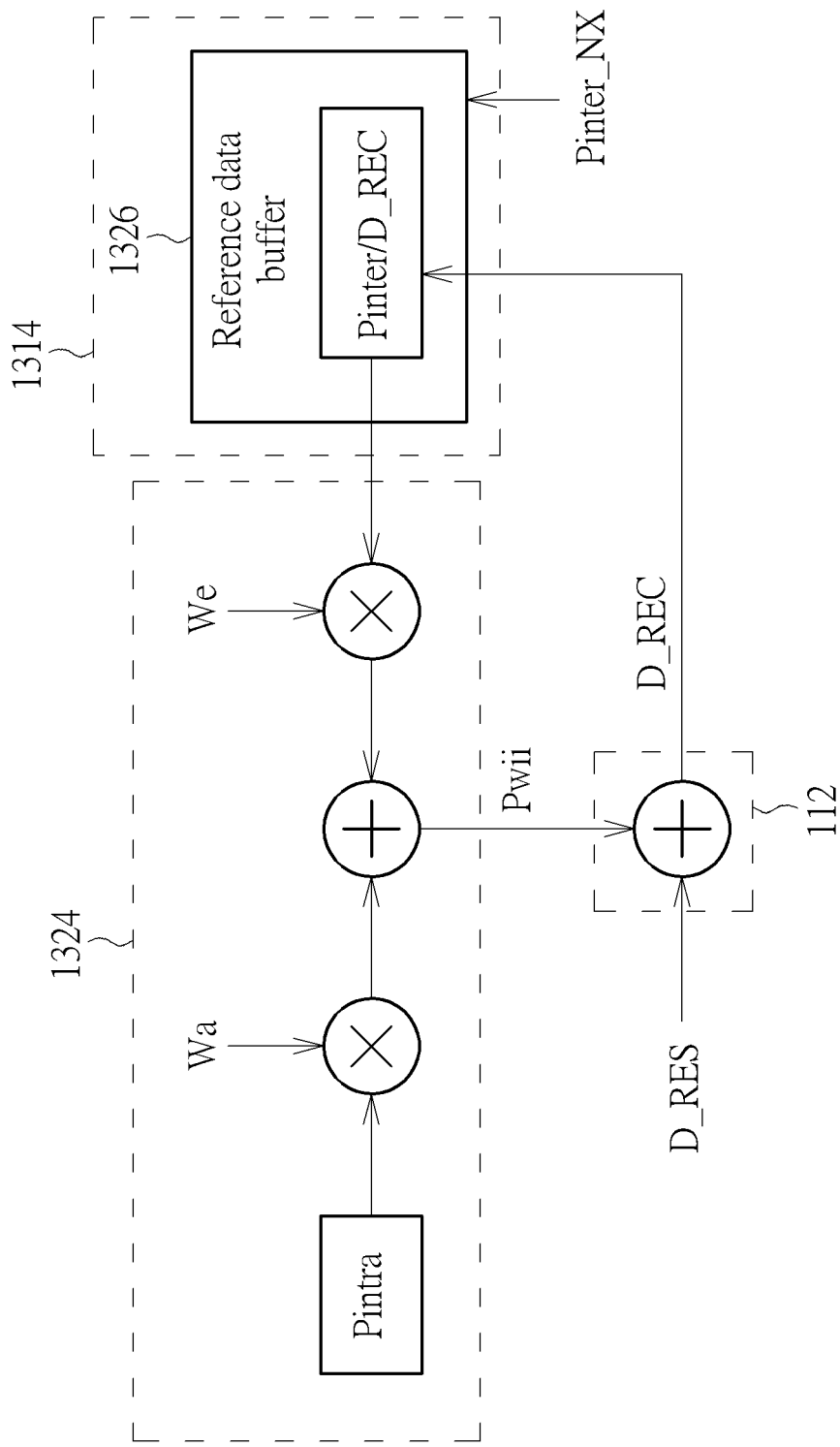
FIG. 16 is a diagram illustrating a CIIP operation performed by the non-inter prediction circuit shown in FIG. 15 according to an embodiment of the present invention.

FIG. 16 is a diagram illustrating a CIIP operation performed by the non-inter prediction circuit 1324 shown in FIG. 15 according to an embodiment of the present invention. The inter prediction circuit 1322 sends an inter prediction result $P_{inter}$ of a current prediction block to the reference data buffer 1326. After the inter prediction result $P_{inter}$ is available in the reference data buffer 1326, the non-inter prediction circuit 1324 fetches the inter prediction result $P_{inter}$ from the reference data buffer 1326, obtains an intra prediction result $P_{intra}$ for the current prediction block, and determines a prediction result $P_{wii}$ for the current prediction block according to the intra prediction result $P_{intra}$ and the inter prediction result $P_{inter}$. For example, the aforementioned formula (1) may be employed for obtaining the prediction result $P_{wii}$.

The prediction result $P_{wii}$ is provided to the reconstruction circuit 112. Hence, a reconstruction result D_REC of the current prediction block is generated by combining the prediction result $P_{wii}$ and the corresponding residual data D_RES, and then stored into the reference data buffer 1326 (which is a part of the reconstruction buffer 1314) to overwrite the inter prediction result $P_{inter}$ that is no longer needed by prediction processing of any prediction block. If the buffer size of the reference data buffer 1326 is large enough to store inter prediction results of multiple prediction blocks, the inter prediction circuit 1322 may perform inter prediction upon a next prediction block when the non-inter prediction circuit 1324 is dealing with related computation for obtaining the prediction result $P_{wii}$, and stores an inter prediction result $P_{inter}$_NX of the next prediction block into the reference data buffer 1326 for later use. In other words, parallel inter and non-inter prediction can be achieved with the help of the reference data buffer 1326.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A prediction processing system comprising:
    a processing circuit, arranged to perform a first inter prediction operation upon a first prediction block to generate a first inter prediction result, and further arranged to perform a second inter prediction operation upon a second prediction block during a first period; and
    a reference data buffer, arranged to buffer a reference data derived from the first inter prediction result;
    wherein the processing circuit is further arranged to fetch the reference data from the reference data buffer, and perform a non-inter prediction operation according to at least the reference data during a second period, wherein the second period overlaps the first period.

2. The prediction processing system of claim 1, wherein a start time of the first inter prediction operation is earlier than a start time of the non-inter prediction operation.

3. The prediction processing system of claim 1, wherein the reference data comprises at least a portion of a reconstruction result obtained by combining the first inter prediction result and corresponding residual data.

4. The prediction processing system of claim 3, wherein the reference data comprises only a portion of the reconstruction result.

5. The prediction processing system of claim 4, wherein the processing circuit is arranged to perform the non-inter prediction operation upon a third prediction block, the first prediction block and the third prediction block are in a same picture, and the first prediction block is a neighboring block of the third prediction block.

6. The prediction processing system of claim 3, wherein the non-inter prediction operation is performed under an intra block copy (IBC) mode.

7. The prediction processing system of claim 1, wherein the reference data comprises the first inter prediction result.

8. The prediction processing system of claim 7, wherein the processing circuit is arranged to perform the non-inter prediction operation upon the first prediction block to generate a non-inter prediction result, and determine a prediction result for the first prediction block according to the inter prediction result and the non-inter prediction result.

9. The prediction processing system of claim 8, wherein the non-inter prediction operation is performed under a combined inter and intra prediction (CIIP) mode.

10. The prediction processing system of claim 7, wherein the reference data buffer is implemented by a shared space in a reconstruction buffer; and the reference data buffer is further arranged to buffer a reconstruction result obtained by combining the prediction result and corresponding residual data, where the first inter prediction result buffered in the reference data buffer is overwritten by the reconstruction result.

11. A prediction processing method comprising:
    performing a first inter prediction operation upon a first prediction block to generate a first inter prediction result;
    buffering a reference data derived from the first inter prediction result in a reference data buffer;
    performing a second inter prediction operation upon a second prediction block during a first period;
    fetching the reference data from the reference data buffer, and performing a non-inter prediction operation according to at least the reference data during a second period, wherein the second period overlaps the first period.

12. The prediction processing method of claim 11, wherein a start time of the first inter prediction operation is earlier than a start time of the non-inter prediction operation.

13. The prediction processing method of claim 11, wherein the reference data comprises at least a portion of a reconstruction result obtained by combining the first inter prediction result and corresponding residual data.

14. The prediction processing method of claim 13, wherein the reference data comprises only a portion of the reconstruction result.

15. The prediction processing method of claim 14, wherein the non-inter prediction operation is performed upon a third prediction block, the first prediction block and the third prediction block are in a same picture, and the first prediction block is a neighboring block of the third prediction block.

16. The prediction processing method of claim 13, wherein the non-inter prediction operation is performed under an intra block copy (IBC) mode.

17. The prediction processing method of claim 11, wherein the reference data comprises the first inter prediction result.

18. The prediction processing method of claim 17, wherein performing the non-inter prediction operation according to at least the reference data during the second period comprises:
    performing the non-inter prediction operation upon the first prediction block to generate a non-inter prediction result; and
    determining a prediction result for the first prediction block according to the inter prediction result and the non-inter prediction result.

19. The prediction processing method of claim 18, wherein the non-inter prediction operation is performed under a combined inter and intra prediction (CIIP) mode.

20. The prediction processing method of claim 17, wherein the reference data buffer is implemented by a shared space in a reconstruction buffer; and the prediction processing method further comprises:
  overwriting the first inter prediction result buffered in the reference data buffer by a reconstruction result, wherein the reconstruction result is obtained by combining the prediction result and corresponding residual data.

21. The prediction processing system of claim 1, wherein the non-inter prediction operation is started after a start time of the first inter prediction operation.

* * * * *